Nov. 19, 1968    H. FELSHER    3,411,799
PUSH VEHICLES FOR INFANTS AND CHILDREN
Filed May 18, 1966    2 Sheets-Sheet 2
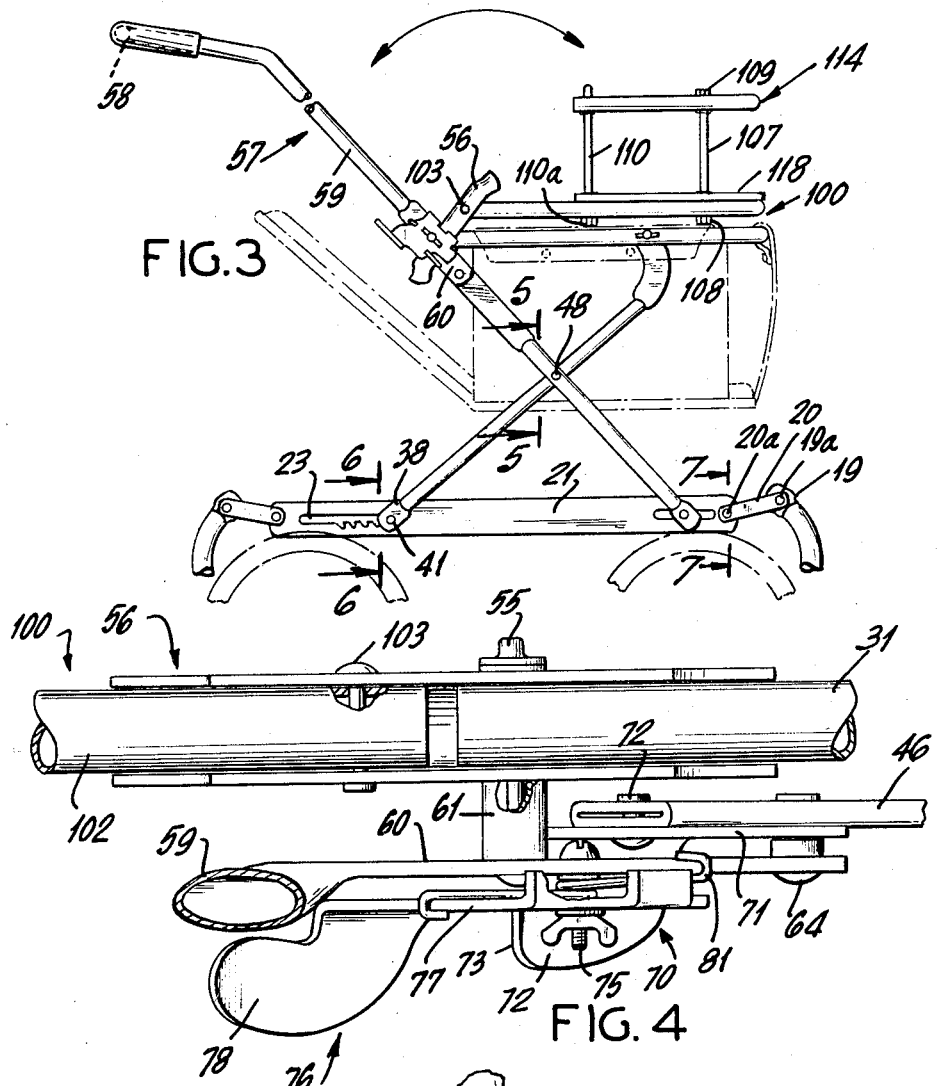
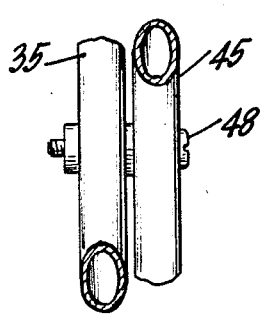
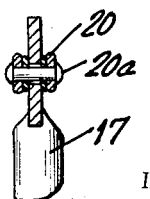
INVENTOR.
HERMAN FELSHER
BY
J.B. Felshin
ATTORNEY.

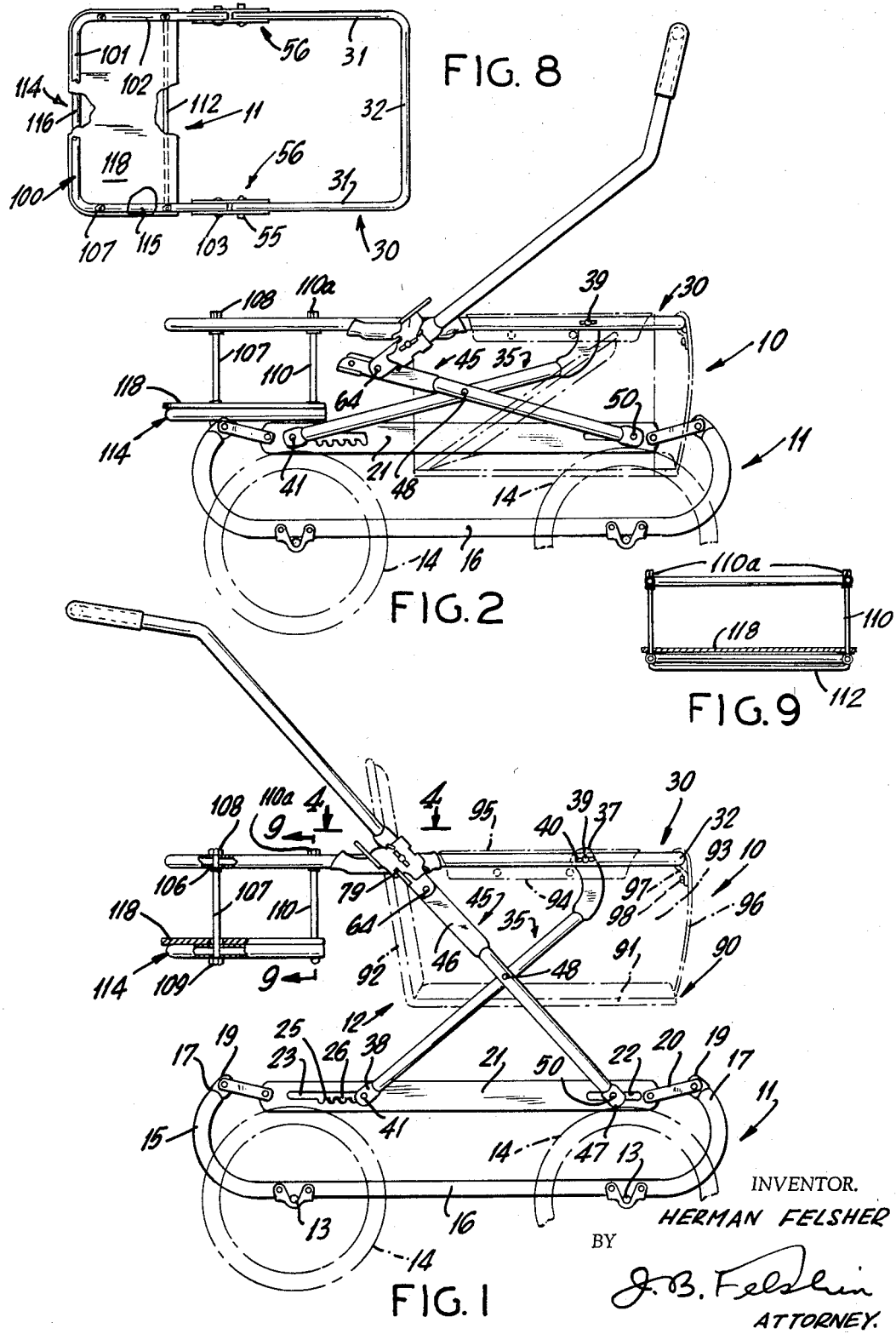

1

3,411,799
PUSH VEHICLES FOR INFANTS AND CHILDREN
Herman Felsher, 6514 18th Ave.,
Brooklyn, N.Y. 11204
May 18, 1966, Ser. No. 551,045
6 Claims. (Cl. 280—36)

ABSTRACT OF THE DISCLOSURE

The invention comprises a push vehicle for infants and children comprising a chassis including a pair of side frames supported on wheels and including a pair of parallel longitudinal members at opposite sides of the device, and formed with slots at the ends thereof. A main seating structure is supported in a body frame to which is pivoted a pair of interpivoted members. These interpivoted members have pins at their lower ends received in the slots. The rear slots have notches with which an opposed pair of said interpivoted members have pin and slot connections. Thus the interpivoted members and the seating structure are adjustable as a whole forwardly and rearwardly in increments, and the interpivoted members are collapsible in any adjusted position.

Mounted on the body frame which supports the main seating structure is an auxiliary seating structure located in back of the main seating structure. When the auxiliary seating structure is in back of the main seating structure, two infants or children may ride on the device in sitting positions. However the main seating structure has a backrest which is movable rearwardly toward and against the auxiliary seating structure. If the child in the main seating structure wants to sleep, the backrest of the main seating structure would go back and strike the legs of the child seating in the auxiliary seating structure. The auxiliary seating structure however is swingable upwardly and forwardly through an angle of 180° to overlie the front end of the main seating structure, so that one child can sleep in the main seating structure with the backrest swung rearwardly, and a second child can sit in the auxiliary seating structure with the legs of the second child hanging down in front of the main seating structure.

Brief summary of the invention

This invention relates to push vehicles for infants and children, such as strollers, carriages and the like.

There are presently on the market strollers for two children, comprising a front main seating structure for receiving a first child and provided with a back rest which may be swung rearwardly about its lower end, and an auxiliary seating structure spaced rearwardly of the main seating structure, for receiving a second child. One difficulty with such present construction is that when the back rest of the main seating structure is swung rearwardly to allow the first child to recline or sleep, said rearwardly swung back rest moves against the legs of the second child in the auxiliary seating structure to interfere with his comfort.

It is hence, one object of this invention to obviate such difficulty by providing a stroller in which the auxiliary seating structure may be moved to a position above the main seating structure and somewhat forwardly of the back rest thereof, whereby to allow the child in the main seating structure to sleep or recline (with the back rest thereof swung rearwardly), and allowing the second child to sit comfortably in the relocated position of the auxiliary seating structure.

Another difficulty experienced with children's push vehicles is that when the vehicle is overloaded at either end, the vehicle has a tendency to overbalance and tilt over. Hence, it is another object of this invention to provide a push vehicle of the character described in which such difficulty is obviated. In accordance with this invention such difficulty is overcome by providing means to move the body of the vehicle (in which the child or children are received), longitudinally, in increments, relative to its supporting chassis, whereby to change the center of gravity of the loaded vehicle body and to bring the same between the axles of the vehicle.

Yet another object of the invention is to provide a vehicle of the character described in which the body can be longitudinally moved on the chassis and which body shall yet be readily collapsible.

Still another object of this invention is to provide a strong, rugged and durable push vehicle of the character described which shall be relatively inexpensive to manufacture, easy to manipulate and adjust, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

Brief description of the several views of the drawing

In the accompanying drawings in which is shown an illustrative embodiment of this invention, FIG. 1 is a side elevational view of a push vehicle embodying the invention and showing the same in position of use with the auxiliary seating structure located at the rear of the main seating structure, and with the body of the vehicle adjusted forwardly relative to the chassis, as far as it can go;

FIG. 2 is a side elevational view of the structure of FIG. 1, but showing the vehicle in collapsed condition;

FIG. 3 is a side elevational view of the vehicle with the auxiliary seating structure swung upwardly and forwardly so as to be located above the main seating structure;

FIG. 4 is a cross-sectional view taken on line 4—4 of FIG. 1;

FIG. 5 is a cross-sectional view taken on line 5—5 of FIG. 3;

FIG. 6 is a cross-sectional view taken on line 6—6 of FIG. 3;

FIG. 7 is a cross-sectional view taken on line 7—7 of FIG. 3;

FIG. 8 is a cross-sectional view taken on line 8—8 of FIG. 2; and

FIG. 9 is a cross-sectional view taken on line 9—9 of FIG. 1.

Description of the preferred embodiments

Referring now in detail to the drawing, 10 designates a push vehicle for infants or children, embodying the invention. Said vehicle 10 comprises generally a chassis 11 on which is mounted a body 12.

The chassis 11 comprises a pair of parallel transverse axles 13 supported on wheels 14. Fixed to said axles 13 are a pair of parallel aligned frame members 15 made of tubular metal stock, each having a lower horizontal portion 16 with upwardly and inwardly extending integral curved arms 17. At the upper ends of arms 18 are upwardly and inwardly extending end bars 19 provided by flattening the tubular stock in vertical planes.

Pivoted to said ears 19 as at 19a are pairs of links 20 extending inwardly toward each other and somewhat downwardly inclined. Pivotally interconnecting the inner ends of said links as at 20a, at each side of the chassis is a side member 21. Each member 21 comprises a flat bar of metal which extends horizontally but in a vertical plane. Links 20 are disposed on opposite sides of bars 21 and ears 19.

Each bar 21 is formed near its front end with a horizontal slot 22, and near its rear end with a horizontal slot 23. Slot 23, in its lower edge, is formed with upwardly and rearwardly slanted teeth 25 forming upwardly and rearwardly slanted notches 26 for the purpose hereinafter appearing.

The body 12 is supported on the bars 21 as will appear hereinafter.

Said body 12 comprises a horizontal frame member 30 having parallel side portions 31 interconnected by a front transverse portion 32. Member 30 may be made of tubular metal stock. Pivoted to said arms 31 are support members 35 which incline downwardly and rearwardly. Said members 35 may be made of tubular stock, with their upper ends 37 and their lower ends 38 flattened into vertical planes. Headed screws 39 pass through openings in upper flattened portions 37 and through registering holes in the side arms 31 to interpivot support members 35 to said side arms. Wing nuts 40 on screws 39 may serve to tighten said support members 35 to said side arms.

Riveted to the lower flattened portions 38 of support members 35 are pins 41 passing through slots 23 and are selectively engageable within notches 26.

Support members 35 are at both sides of the body and are located in vertical planes.

Interpivoted to intermediate portions of support members 35, and crossing the same are support members 45 which also may be made of tubular metal stock flattened at their upper ends 46 and at their lower ends 47. Each pair of members 35, 45 are interpivoted by bolts or pins 48. The lower flattened portions 47 of members 45 carry pins 50 riveted thereto and passing through slots 22.

Pivoted to the rear end of each arm 31, as by a transverse bolt or pin 55, is an interconnecting member 56 of U-shaped transverse cross-section, in which the rear end of said arm is received or nested. Members 56 extend rearwardly beyond the rear ends of arms 31, as seen in FIG. 4, for the purpose hereinafter appearing.

Pivoted to said bolts or pivots 55 is a handle member 57. Said handle member 57 may also be made of tubular stock and comprises a top horizontal, transverse push bar 58 from which extend downwardly and forwardly a pair of inclined arms 59. The lower ends of arms 59 are flattened together, as at 60, and are pivoted to said pivots 55. Spacers or washers 61 of any suitable type, on said bolts 55 are interposed between members 56 and flattened portions 60 of the side arms 59 of said handle member 57. The upper ends of flattened portions 46 of support members 45 are pivoted, as by pivots 64, to the lower ends of flattened portions 60 (which extend below said bolts 55).

Thus, the handle member 57 may be swung in a clockwise direction from the position of FIG. 1 to the position of FIG. 2, to collapse the body. During such collapsing movement, the lower ends of said crossing interpivoted members 35, 45 spread apart, as do the pivots 39, 64 thereby causing the frame 30 to lower and the pivots 50, 41 at the same time slide outwardly in their respective slots 22, 23. The upward and rearward slant of notches 26 of slot 23 facilitate movement of pins 41 out of the notches and rearwardly.

Means is provided to retain the body in the extended normal position of use shown in FIG. 1. To this end there is fixed to the upper end of each portion 46, a bracket 70 having a flange 71 lying against said portion 46 and attached thereto by said pivot 64 and by a rivet 72. Extending from flange 71, at right angles thereto, is a flange 72 having an upper edge 73.

Pivoted to each flattened portion 60, as by a bolt 75 located between pivots 55 and 64, is a latch member 76 having a flange 77 parallel to said flattened portion, and a finger flange 78 extending at right angles to said flange.

Flanges 77 of latches 76 each has a notch 79 to engage the upper edge 73 of flange 72, when the body is in set-up position for use, to retain said body in such position, and to prevent accidental collapsing of said body. A torsion spring 81 on bolt 75 normally retains latch 76 in latching position. To collapse the body, handles 78 are pushed up to disengage said flanges 72, whereby to permit rotation of said push handle member forwardly. The latching means described herein is well known.

It will be noted that when the body 12 is in collapsed position, pins 41 and 50 are at the outer ends of slots 23, 22 respectively. In the extended or set-up position of FIG. 1, the pins 41, 50 are spaced inwardly of the outer ends of said slots, and hence the entire body may be moved forwardly or rearwardly, as a whole, from the position of FIG. 1, to change the center of gravity of the body and to bring the center of gravity thereof between the axles 13, so as to prevent tilting, as may happen if the body is overloaded at either end. Such adjustment rearwardly is facilitated by the fact that teeth 25 slant rearwardly and upwardly. Also, once the adjustment is made, forward push of the stroller will not dislodge pins 41 from the notches 26.

A main seating structure 90 is mounted on the frame 30. Such main seating structure may be of usual construction and may hence comprise a bottom seat 91 to the rear end of which, a back rest 92 is hinged at its lower end. Side portions 93 of flexible sheet material are attached to the sides of the seat and may extend up and around the side arms 31 of frame 30 forming flaps 94 fastened to side portions 93 by means of snap fasteners 95. A front flexible sheet 96 extends up from the front end of seat 91, with its upper end folded over the front bar 32 of frame 30 to form flap 97 fastened to portion 96 by snap fasteners 98.

One child may sit in seating structure 90 with feet passing through openings or notches in front wall 96. Any suitable well known means may be provided to hold the back rest upright when the child in seating structure 90 is sitting upright. Such holding means is usually releasable to permit the back rest to tilt back so that the child in structure 90 may sleep or recline.

Heretofore, an auxiliary seating structure was provided in back of the back rest to accommodate a second child. When the back rest was tilted back to allow the child in the main seating structure to sleep, the back rest would move against the legs of the child in the auxiliary rear seat and interfere with his comfort.

Means is therefore provided herein to seat a second child but such means is in accordance with the present invention, movable to such a position that when the back rest is swung or tilted back, it will not interfere with such auxiliary seating structure. There is hence provided a U-shaped frame 100 which likewise may be made of tubular stock. Frame 100 comprises a rear transverse horizontal bar 101 from which extend forwardly a pair of parallel arms 102, the forward end portions of which are nested in the rear ends of interconnecting members 56, and pivoted thereto by means of horizontal transverse pivot pins or bolts 103. Members 56 extend rearwardly beyond pins 103. Thus members 56 maintain frame 100 in the horizontal plane of frame 30.

Arms 102 are formed with aligned pairs of vertical openings 106. Extending through the rear openings 106 are tie rods 107 having heads 108 at their upper ends and heads 109 at their lower ends. Extending through the front openings 106 are vertical side arms 110 of a U-shaped member 111. Arms 110 are interconnected by a transverse bottom portion 112. At the upper ends of arms 110 are heads 110a contacting arms 102 of frame 100. Resting on the lower heads 109 and on cross-portion 112 is a lower U-shaped frame 114 which may also be made of tubular stock. Rods 107 and arms 110 pass through suitable openings in frame member 114. Frame member 114 has side arms 115 interconnected by a transverse portion 116 and is aligned with upper frame 100, and is fixed to the lower ends of rods 107 and to cross-portion 112 of member 111.

Slidably mounted on rods 107 and on vertical arms 110 is a seat 118 which may be made of fiberboard and has suitable holes through which rods 107 and vertical arms 110 pass.

In the position of normal use, seat 118 rests on frame 114. A child can thus sit on seat 118 and lean back against cross-portion 101 of frame 100. The child sits between side arms 102 of frame 100 with legs hanging down at the rear of back-rest 92. This is a usual position for seating the second child in strollers as heretofore constructed.

However, in accordance with the present invention, if the back rest 92 is to be swung back to allow a child in the main seating structure to sleep, the frame 100 is first swung from the position of FIG. 1 to the position of FIG. 3. During such operation, members 56 swing up in clockwise directions about pivots 55 and frame 100 swings clockwise about pivots 103. Frame 100 swings through an angle of 180° so as to be disposed over frame 30. Heads 108 and 110a contact arms 31 of frame 30. Seat 118 slides down arms 107, 110 to rest on frame 100. The child sits on the seat 118 in the position of FIG. 3, and is then located between side arms 115 of frame 114 and between cross-bar 116 of frame 114 and cross-bar 112 of member 111. The legs of the child on seat 118 hang down at the front of the stroller.

Thus the rearwardly tilted back-rest 92 cannot interfere with the child in the auxiliary seat when the same is in the position of FIG. 3.

It will thus be seen that there is provided an apparatus in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:
1. A push vehicle comprising:
 (a) a chassis having generally parallel frame members;
 (b) a body mounted on said frame members comprising:
  (1) a main seating structure having an upper frame member and a back rest adapted to tilt back from an upright position to a downward position;
  (2) an auxiliary seating structure;
  (3) means adapted to mount said auxiliary seating structure on said body in a first position behind said back rest and further adapted to swing said auxiliary seating structure from said first position to a second position above said upper frame portion and forward of said back rest to permit said back rest to tilt back without interfering with an occupant of said auxiliary seating structure.

2. The push vehicle of claim 1 having means to adjust said body on said parallel frame members to compensate for changes in the center of gravity of said body relative to said chassis caused by moving said auxiliary seating structure from said first position to said second position.

3. The push vehicle of claim 1 wherein said auxiliary seating structure comprises a seat support and a seat slideable on said seat support so as to be located at the bottom of said seat support in both said first and second positions.

4. The push vehicle of claim 2 wherein means are provided for maintaining said body in a fixed position in relation to said chassis.

5. The push vehicle comprising:
 (a) a chassis having generally parallel frame members having slots therein;
 (b) a body mounted on said frame members and comprising a seating structure and means for mounting said seating structure comprising crossing, support members, the lower ends of said support members being slideably mounted with respect to the slots of the parallel frame members whereby the body can be adjusted longitudinally to compensate for changes in the center of gravity of said body relative to said chassis.

6. The push vehicle of claim 5 wherein said support members and said parallel frame members have means for maintaining said body in a fixed position in relation to said chassis.

References Cited

UNITED STATES PATENTS

| | | | |
|---|---|---|---|
| 2,521,422 | 9/1950 | Strand | 155—54 |
| 2,743,937 | 5/1956 | Ginsberg | 280—41 |
| 3,036,652 | 5/1962 | Barenyl | 180—54 |
| 3,110,540 | 11/1963 | Myers | 280—36 |
| 3,222,081 | 12/1963 | Harmon | 280—36 |

BENJAMIN HERSH, *Primary Examiner.*

J. SIEGEL, *Assistant Examiner.*